UNITED STATES PATENT OFFICE.

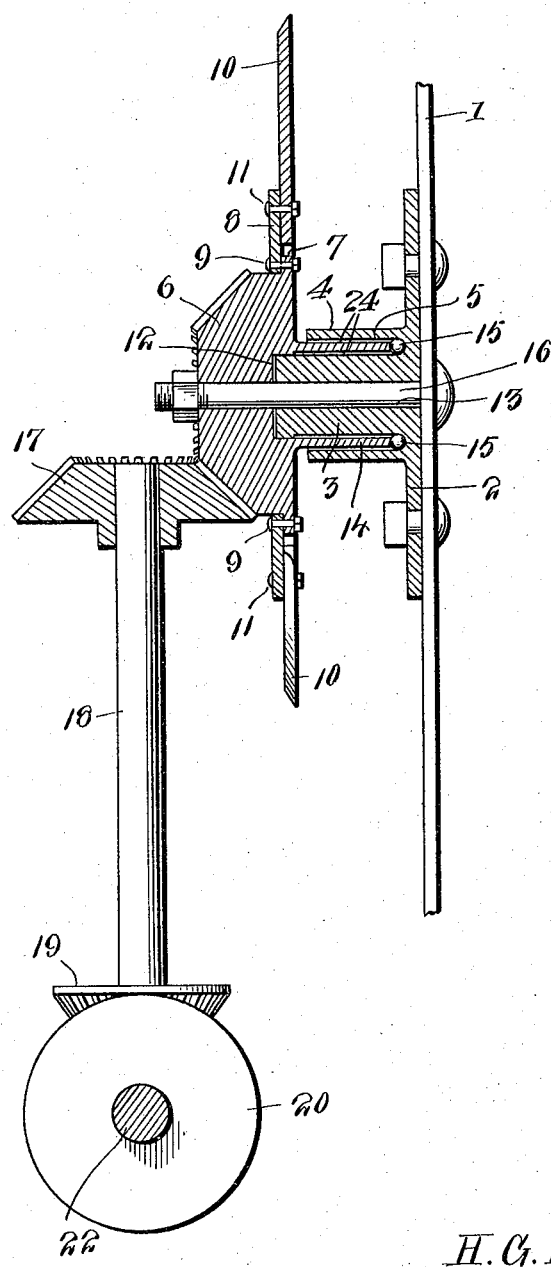

HENRY G. ROTEN AND WILLIAM W. EMBRY, OF BALLINGER, TEXAS.

ANTIFRICTION-BEARING FOR CUTTING APPARATUS.

1,170,341.

Specification of Letters Patent. Patented Feb. 1, 1916.

Application filed November 29, 1912. Serial No. 734,187.

*To all whom it may concern:*

Be it known that we, HENRY G. ROTEN and WILLIAM W. EMBRY, citizens of the United States, residing at Ballinger, in the county of Runnels and State of Texas, have invented new and useful Improvements in Antifriction-Bearings for Cutting Apparatus, of which the following is a specification.

This invention relates to anti-friction bearings applicable to cutting apparatus for harvesters and especially for corn harvesters, and it has for its object to produce a rotary cutting apparatus of simple and improved construction which will engage and sever the stalks more efficiently than the stationary knives heretofore used.

A further object of the invention is to produce an anti-friction bearing for rotary cutting apparatus of simple and improved construction and of great strength and durability.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

The drawing represents a vertical sectional view of the improved device.

A frame, a portion of which appears at 1, supports a plate 2 having an upwardly extending cylindrical boss 3 which is surrounded by a sleeve 4, which latter also rises from the plate 2, said sleeve being concentric with the boss, and the sleeve being separated from the boss by an annular space 5. The height of the boss 3 materially exceeds that of the sleeve 4, as will be clearly seen in the drawing.

6 designates a bevel gear having an annular flange 7 on which a disk or ring 8 is mounted and secured by fastening means, such as rivets 9. A plurality of teeth or cutters 10 which may be of the triangular shape customarily employed in cutting apparatus for harvesters are secured on the ring or disk 8 by fastening means, such as rivets 11. The bevel gear is provided in its underside with a recess or socket 12 surrounding the axial bore 13, said recess being adapted to accommodate the upper extremity of the boss 3. The bevel gear is also provided with a downwardly extending sleeve 14 which is concentric with the axis of the wheel and which is adapted to enter the annular space 5 between the boss 3 and the sleeve 4 in which annular space the sleeve 14 is freely accommodated. The bottom of the annular space 5 constitutes a ball race into which anti-friction balls 15 are placed to support the sleeve 14 and related parts. The bevel gear 6 and the parts appertaining thereto are assembled with the base plate 2 and related parts, including the frame 1 of the machine, by means of a bolt 16 about the axis of which the bevel gear revolves.

Suitably supported in mesh with the bevel gear 6 is a bevel pinion 17, the latter being shown as mounted on a shaft 18 having a second bevel pinion 19 to receive motion from a bevel gear 20, on a driven shaft 22.

From the foregoing description, taken in connection with the drawings hereto annexed, the operation and advantages of this invention will be readily understood.

The improved device is extremely simple in construction, and it may be easily installed on a corn harvester of ordinary construction. The base plate 2 supports the entire cutting apparatus through the medium of the anti-friction balls 15. The sleeve 14 engaging the anti-friction balls is spaced from the walls of the boss 3 and the sleeve 4, which latter may constitute a receptacle 24 for lubricant, which may be readily supplied to said receptacle without disassembling the parts, owing to the fact that the upwardly extending flange or sleeve 4 which surrounds the boss 3 and the bearing sleeve 14 terminates below the bevel gear or rotary member 6 and is in no way obstructed. Steadiness of motion is insured by the boss 3 engaging the socket or recess 12 in the bevel gear 6, the contacting faces being of small extent but amply sufficient to prevent wabbling without undue friction. The parts may be easily assembled by the bolt 16, and it follows that the parts may be very readily disassembled for repairs or for sharpening of the knives or cutters. The general construction is of such a nature as to render the device thoroughly efficient for the purposes for which it is provided.

Having thus described the invention, what is claimed as new, is:—

A base plate having an upwardly extending boss and a sleeve surrounding the same, spaced therefrom and concentric therewith, a revoluble member consisting of a bevel gear having a socket engaging the upper end of the boss and a sleeve extending into the space between the boss and the surrounding sleeve and spaced from said boss and sleeve to form a lubricant receptacle, anti-friction balls fitted in the space between the boss, the surrounding sleeve and the sleeve associated with the bevel gear, and an assembling bolt extending axially through the base plate, the boss and the bevel gear.

In testimony whereof we affix our signatures in presence of two witnesses.

HENRY G. ROTEN.
WILLIAM W. EMBRY.

Witnesses:
J. WILMETH,
R. A. GUSTAVUS.

Copies of this patent may be obtained for five cents each, by addressing the "Commissioner of Patents, Washington, D. C."